June 9, 1953         R. R. LA MARRE         2,641,487
FLARELESS RIGID TUBE END FITTING
Filed July 13, 1949
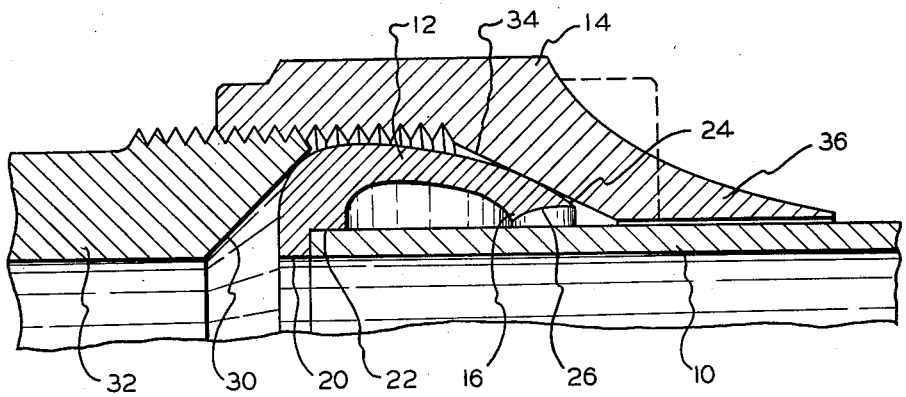
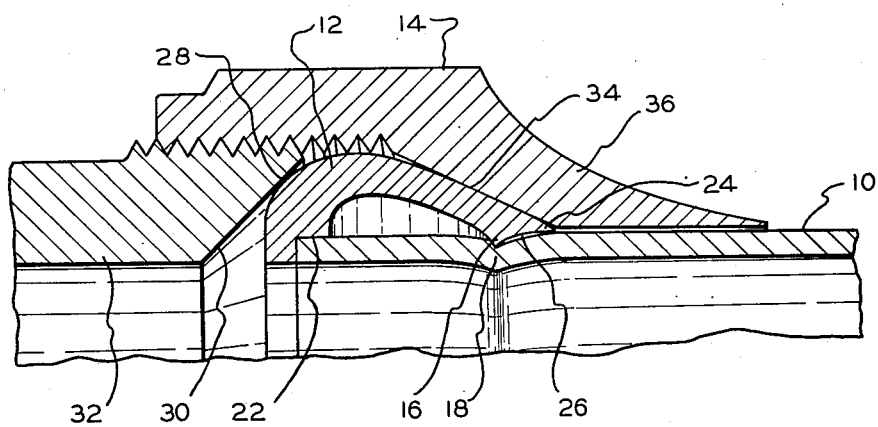
Inventor
ROGER R. LaMARRE
By Beaman Patch
ATTORNEYS

UNITED STATES PATENT OFFICE 2,641,487

FLARELESS RIGID TUBE END FITTING

Roger R. La Marre, Jackson, Mich., assignor to Aeroquip Corporation, Jackson, Mich., a corporation of Michigan Application July 13, 1949, Serial No. 104,410

1 Claim. (Cl. 285—122)

This invention relates to flareless rigid tube end fittings of the type which employ a deformable sleeve member adapted to fit over the end of the tube which it is desired to couple to a relatively fixed adapter or other structure, such as the end of a valve, flexible hose, or a self-sealing coupling, said sleeve member being formed to present a knife edge to the exterior tube surface, which edge penetrates and bitingly grips the tube, upon deformation of the sleeve member, by the actuation of an encircling coupling member, usually in the form of a union nut threaded upon the adapter or like structure.

The problem in such type of fitting is the maintaining of sufficient grip upon the tube end without the introduction of an excessive over-lap between the tube end and the adapter or other structure to which it is desired to couple and affix the rigid tubing. This problem is further complicated by the fact that in order to keep the overall dimensions of the end fitting as small as is practicable it is necessary that the grip upon the tube should be confined as close as possible to the end thereof to be coupled.

It is the object of the present invention to meet the above problems with the provision of a rigid flareless tube end fitting in which the amount of overlap is reduced to a minimum yet with the maintaining of an efficient grip upon the tube end. In carrying out the invention, the deformable sleeve member is formed to have abutting engagement at one end thereof with the tube end in opposition to the pressure applied to the sleeve member by the encircling coupling member to deform the latter on to the tube end, and the sleeve member is formed bitingly to engage the tube towards the end of the sleeve member remote from its said abutting end, the said pressure being applied to the sleeve members at a point corresponding to the thus axially spaced point of biting engagement.

Another object of the invention is to provide a fitting of the above described type in which the deformable sleeve is of such improved construction that it cannot be improperly located in position but due to its inherent construction can only be located in the position in which it is intended to operate. This results from the fact that the sleeve has an inturned flange at one end which is adapted to have abutting contact with one end of the rigid tube and which precludes the sleeve from being slid onto the tube from its flanged end.

These and other objects and advantages of the invention will become apparent from a consideration of the following description and claim with reference to the accompanying drawings in which:

Fig. I is a half longitudinal section of one embodiment of the invention, with the end fitting parts positioned ready for deformation of the tube end clamping sleeve, and Fig. II is a similar view of Fig. I with parts in operative position, the clamping sleeve being shown deformed and bitingly engaged in the tube end.

Referring to the drawings 10 indicates a substantially rigid flareless tube and 12 a deformable sleeve which is adapted to be slid over one end of the tube and to be deformed, by the action of tightening a union nut 14, to cause an annular knife edge 16 to bite into the tube surface as indicated at 18 in Figure II.

The sleeve 12 has its knife edge 16 defined towards one end of the sleeve, being the end remote from an inturned flange 20 which is adapted to abut against the end edge of the tube 10 corresponding to that on the end portion of the tube to which the end fitting is required to be applied. This flange defines an interior cylindrical surface portion 22 which has sliding engagement with the tube end and is axially spaced from the annular knife edge 16, the latter in turn being axially spaced from the opposite end edge 24 of the sleeve by the existence of the concave interior surface portion 26, the latter being preferably such as defines the end edge 24 on a larger diameter than the knife edge 16.

On its exterior surface the sleeve 12 is rounded, as shown, and presents a sealing contact zone 28 to the tapered surface 30 of a nipple 32 or an adapter or other structure to which it is desired releasably to connect the tube 10.

The union nut 14 has screw-threaded engagement with the nipple 32, as shown, and is also formed with an interior tapered surface 34, the angle of which is approximately 20 to 30° to the horizontal and by which surface the required pressure is applied to the sleeve 12 in the neighborhood of the knife edge 16 to deform the sleeve and cause the knife edge to bite into the tube surface.

Preferably, the union nut 14 is formed with a tapered elongated extension 36 to give the maximum support to the tube 10, but the nut may take other shapes and forms, one of which is shown dotted in Figure I.

To apply the fitting the sleeve 12 is slipped over the end of the tube 10 to abut the end flange 20 against the tube end as shown in Figure 1. The existence of this flange precludes the possibility of the sleeve being slid on from the wrong end and insures that the knife edge 16 is properly positioned for biting into the tube when the union nut 14 is tightened. This applies pressure to the sleeve in the region of the tapered nut surface 34, which pressure has a component along the tube end which is opposed by the abutting end flange 20 and the stop offered by the nipple 32, and results not only in the tube end being adequately supported against collapse but also leaves the knife edge 16 to be bitingly engaged in the tube as the sleeve is deformed with the continued tightening action of the union nut 14 and with the use of the mechanical advantage resulting from a screw-threading action.

As more clearly shown in Fig. II, the end edge 24 is deformed into contiguous relation with the outer wall of the tube 10 with the result that the tube 10 is supported on both sides of the portion engaged by the knife edge 16, namely, by the portion 22 and the end edge 24. Also as seen in Fig. II, the curvature of the wall of the concaved portion 26 assures the localization of pressure at the knife edge 16.

Having thus described the invention in one particular form but without limitation to the specific details thereby involved which I claim as novel and wish to secure by Letters Patent is as follows:

In a rigid flareless tube end fitting having a tubular externally threaded adaptor portion with a conical sealing and stop portion and an internally threaded union nut having a conical sleeve portion in axial opposition to the conical portion of the adaptor, a sealing sleeve for the tube having an abutment end and an axially spaced deformable end, said sleeve having prior to deformation an internal diameter throughout the major portion of its length which will receive with a sliding fit one end of a tube with the minor portion of said sleeve at said abutment end being in the form of an inturned flange with which the tube end abuts, the abutment end of said sleeve being of substantially greater cross-sectional area than that of said deformable end to present a rigid relatively undeformable sealing and abutment portion radially spaced from said inturned flange and engaging with the conical portion of the adaptor only at a point adjacent the threaded engagement between the adaptor and the nut, the outer surface of said sleeve bulging outward adjacent said abutment end and then having a generally inward tapering surface toward said deformable end to terminate in a tapered nose portion, the interior of said sleeve being concaved on opposite sides of an intermediate point adjacent the tapered nose portion of said sleeve to provide an annular interior and deformable knife edge and to reduce the cross-sectional area of the tapered portion of said sleeve at the deformable end, the outer tapered surface of said sleeve opposite said knife edge being slightly curved at the point of initial engagement with the conical surface of the nut whereby said curved surface is deformable and said knife edge is contractable upon the tube with the terminal portion of said tapered nose contiguous with the tube.

ROGER R. LA MARRE.

References Cited in the file of this patent

UNITED STATES PATENTS

| Number | Name | Date |
|---|---|---|
| 1,063,926 | Schuermann | June 3, 1913 |
| 2,233,214 | Lamont | Feb. 25, 1941 |
| 2,463,707 | Matousek | Mar. 8, 1949 |
| 2,522,785 | Hanson | Sept. 19, 1950 |

FOREIGN PATENTS

| Number | Country | Date |
|---|---|---|
| 515,479 | Great Britain | Dec. 6, 1939 |